(No Model.) 2 Sheets—Sheet 1.
C. J. STEINBACH.
CIRCULAR SAWING MACHINE.
No. 269,736. Patented Dec. 26, 1882.
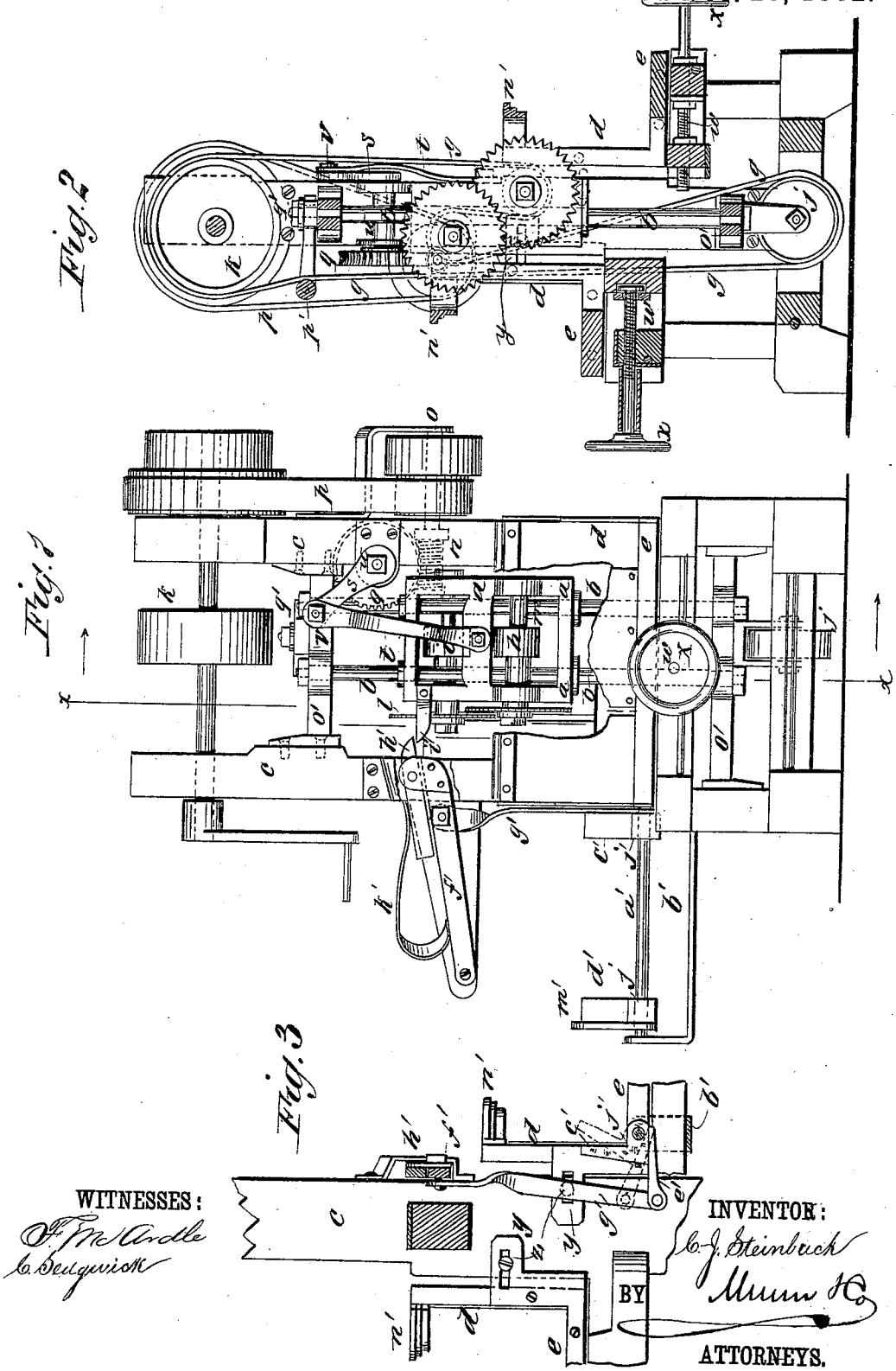
WITNESSES:
INVENTOR: C. J. Steinbach
BY Munn & Co.
ATTORNEYS.

(No Model.)  2 Sheets—Sheet 2.
C. J. STEINBACH.
CIRCULAR SAWING MACHINE.
No. 269,736.  Patented Dec. 26, 1882.
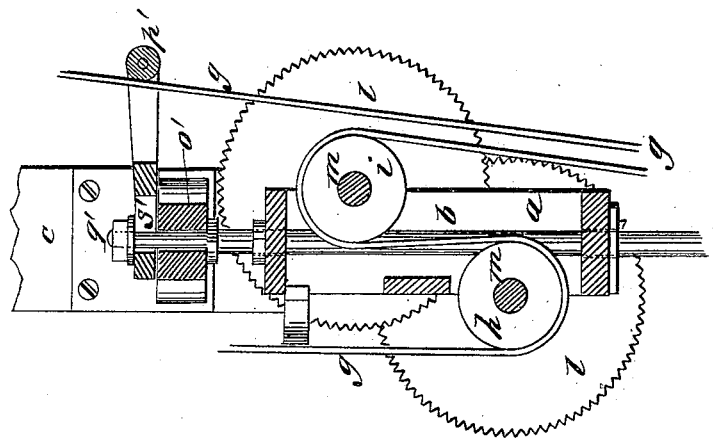
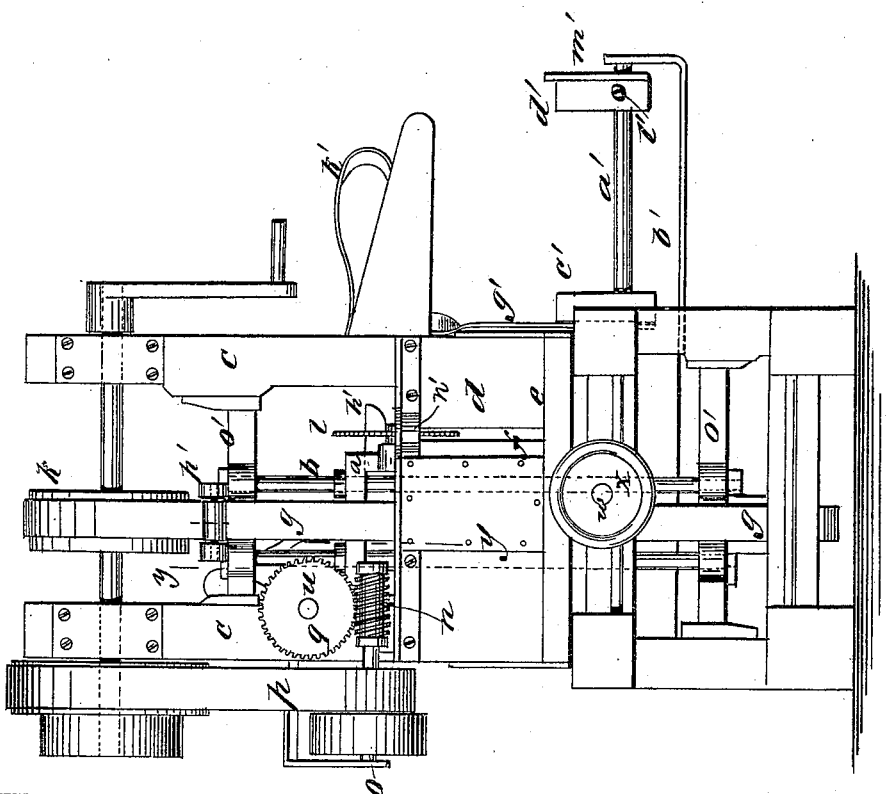
WITNESSES:
Francis McArdle
C. Sedgwick
INVENTOR:
C. J. Steinbach
BY Munn & Co.
ATTORNEYS.

UNITED STATES PATENT OFFICE.

CHRISTIAN J. STEINBACH, OF ST. LOUIS, MISSOURI.

CIRCULAR SAWING MACHINE.

SPECIFICATION forming part of Letters Patent No. 269,736, dated December 26, 1882.

Application filed September 15, 1882. (No model.)

*To all whom it may concern:*

Be it known that I, CHRISTIAN J. STEINBACH, of St. Louis and State of Missouri, have invented a new and Improved Sawing-Machine, of which the following is a full, clear, and exact description.

My invention relates to cut-off sawing-machines in which the saws are made to traverse instead of the wood for feeding; and it consists essentially of utilizing both of the shafts of the pulleys of a back-gear contrivance, of a belt and sliding frame employed for traversing a saw in right lines for saw-arbors, together with a double saw-bench contrivance, whereby a single saw slide and belt are made to work two saws instead of one, as heretofore.

The invention also consists of an improved arrangement of the gear for reciprocating the said slide, an automatic discharging apparatus for the work, and an adjustable gage-stop for the work, all as hereinafter described.

Reference is to be had to the accompanying drawings, forming part of this specification, in which similar letters of reference indicate corresponding parts in all the figures.

Figure 1 is a front elevation of my improved sawing-machine with a part of the bench broken out. Fig. 2 is a sectional elevation taken on the line $x\,x$ of Fig. 1. Fig. 3 is a detail inside elevation. Fig. 4 is an elevation in reverse of Fig. 1; and Fig. 5 is a vertical detail section on line $y\,y$ of Fig. 4, the scale being enlarged.

The saw-frame $a$ is mounted on the rods $b$, to reciprocate vertically in the upright frame $c$, for traversing the vertical side $d$ of the saw-bench to saw the boards set edgewise on the table $e$ against side $d$, in which there is a slot, $f$, through which the saw works. The rotary motion is communicated to the saws while traversing in this sliding frame by the back-gear contrivance of the belt $g$ on the pulleys $h$ $i$ on said frame, and by extending around the idle-pulley $j$ at the end of frame $c$ opposite to the end where the driving-pulley $k$ is mounted, which in this case is at the top of said frame $c$.

In the use of this method of driving a traversing saw I propose to utilize the shafts $m$ of both of the pulleys $h$ and $i$ for carrying saws by mounting a saw, $l$, on each and providing a bench for each saw by the application of a table, $e\,d$, on each side of the frame, thus doubling the capacity of the machine by the attendance of an additional sawyer, also economizing space in the shop. It will be seen that the natural arrangement of these back-gear pulleys on the opposite sides of the frame $a$ for the performance of their use projects the saws on the respective sides of the frame, so that they will not interfere with each other, and although one must set a little higher than the other, it only requires the benches to be set accordingly.

The frame $a$ is made to reciprocate for traversing the saws by the worm $n$ on a counter-shaft, $o$, driven by a belt, $p$, which turns the wheel $q$, to the axis $u$ of which a crank, $s$, is attached, which connects with frame $a$ by a rod, $t$; but the worm may be on the top shaft and the wheel $q$ suitably arranged thereat to dispense with the counter-shaft $o$, driving-pulleys, and belt $p$. I have located the axis $u$ of this crank $s$ about as far to one side of where the rod $t$ connects with the frame $a$ as the length of the crank $s$, and have geared said crank so that it raises the frame when the crank-pin $v$ traverses the same side of its path that the frame $a$ is on, and it moves said frame down when it traverses the other side of its path, by which the descending movement is slower when the saws are at work than the ascending movement when they do no work. It results from the different angles of the crank and connecting-rod in the different parts of the circular path of the crank-pin and affords a period of rest before the saws descend, during which the sawyer may shift his work.

The saw-benches $e\,d$ are made adjustable by screws $w$ and hand-wheels $x$ to set the sides $d$ more or less back of the front projections of the saws, according to the thickness of the stuff to be sawed, and they have slotted guide-brackets $y$, with set-screws $z$, to make the sides $d$ fast to the frame $c$ when adjusted.

For an automatic discharger for the pieces sawed off, I arrange a shaft, $a'$, in an extension-bracket, $b'$, along the line of the angle between bench $e$ and side $d$, with arms $c'$ and $d'$ projecting upward in the plane of side $d$, or thereabout, connecting said shaft by an arm, $e'$, with a lever, $f'$, by a rod, $g$, said lever being provided with a latch, $h'$, which is engaged by a stud, $i'$, on the saw-frame $a$ when it goes up, lifting lever $f'$ and swinging arms $c'$ and $d'$ forward, as shown in dotted lines, Fig. 3, to push off the sawed pieces, which, while being sawed, rest on the ledges $j'$ of said arms. The spring $k'$ presses down the lever $f'$ to return the dischargers to the upright position, and the latch $h'$ allows the stud $i'$ to descend for the saws to work without any effect on the dischargers. The discharger $d'$ is made adjustable along the shaft $a'$ with a set-screw, $l'$, to fasten it, and it has a stop, $m'$, attached for a gage by which to set the stuff for length, the end being set against the stop when the piece to be sawed is placed on the bench.

The sides $d$ of the benches have guards $n'$ projecting from the upper edge around the slots $f$, for the protection of the sawyers from injury by the saws.

The rods $b$, on which the saw-frame $a$ works, are supported in suitable cross-beams, $o'$, attached to the uprights $c$ of the frame. The belt-tightener $p'$ is attached to the upper one of these cross-beams, and fastened by a bolt and nut, $q'$, the bolt passing through a slot, $s'$, allowing the tightener to be shifted from time to time as the belt slackens.

It will be seen that a machine thus contrived will furnish double the sawing capacity of the ordinary machines without any additional cost, except the extra saw and bench, and without requiring any more space, except for the extra bench and sawyer. It is designed for use in wood-working establishments where large quantities of stuff are sawed to special sizes.

Having thus fully described my invention, I claim as new and desire to secure by Letters Patent—

1. The combination, with two independently-adjustable saw-tables, $e$, of two saws, $l$, and two pulleys, $h$ $i$, mounted on two shafts, $m$, both journaled in a single frame, $a$, adapted to reciprocate between said tables, and means for revolving the saws and reciprocating their frame, substantially as specified.

2. The two independently-adjustable saw-tables $e$, the frame $a$, adapted to slide vertically upon the rods $b$, the two shafts $m$, journaled therein, and the saws $l$ and pulleys $h$ $i$ on said shafts, in combination with the driving-pulley $k$, idle-pulley $j$, and the belt $g$, as and for the purpose specified.

3. The combination, with saws $l$, of saw-benches, consisting of table $e$ and side $d$, said side having slot $f$ and guard $n'$, substantially as described.

4. The saw or saws $l$, journaled in the reciprocating frame $a$, and means for revolving the same, substantially as specified, in combination with the crank $s$ and the pitman $t$, connecting it to frame $a$, the gear-wheel $q$, the worm $n$, meshing therein, the shaft $o$, the pulley thereon, and the belt $p$ for driving the same, as and for the purpose specified.

5. The saw-bench $e$, provided with a rock-shaft, $a'$, and the discharging-arms $c'$ and $d'$, fixed thereto, in combination with the stud $i'$, fixed to the saw-frame $a$, the lever $f'$, provided with the finger $h'$, and spring $k'$, and connecting-rod $g'$, and arm $e'$, as and for the purpose specified.

6. The saw-bench $e$, provided with a rock-shaft, $a'$, having the discharger $c'$ secured thereon, in combination with the discharger $d'$, provided with the stop-gage $m'$, and the set screw $l'$, whereby it may be adjusted along the shaft $a'$, and whereby the discharger $d'$, with its gage-shoulder $m'$, performs a double office, as specified.

CHRISTIAN JOSEPH STEINBACH.

Witnesses:
O. J. O'BRIEN,
FRANCIS JOSEPH STEINBACH.